(12) United States Patent
Burroughs et al.

(10) Patent No.: US 8,484,574 B2
(45) Date of Patent: Jul. 9, 2013

(54) RULE-BASED MULTI-PANE TOOLBAR DISPLAY

(75) Inventors: Chris E Burroughs, Woodinville, WA (US); Justin W Hartin, Bellevue, WA (US); Michael J Miles, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1165 days.

(21) Appl. No.: 11/951,459

(22) Filed: Dec. 6, 2007

(65) Prior Publication Data

US 2009/0150810 A1 Jun. 11, 2009

(51) Int. Cl.
*G06F 3/048* (2006.01)

(52) U.S. Cl.
USPC .......................... 715/779; 715/764

(58) Field of Classification Search
USPC .................................. 715/764, 779
See application file for complete search history.

(56) References Cited

U.S. PATENT DOCUMENTS

| | | | |
|---|---|---|---|
| 5,644,737 A * | 7/1997 | Tuniman et al. ............... | 715/810 |
| 5,859,623 A * | 1/1999 | Meyn et al. .................... | 715/730 |
| 6,232,972 B1 | 5/2001 | Arcuri et al. | |
| 6,247,020 B1 | 6/2001 | Minard | |
| 6,624,831 B1 | 9/2003 | Shahine et al. | |
| 6,784,900 B1 | 8/2004 | Dobronsky et al. | |
| 6,925,608 B1 | 8/2005 | Neale et al. | |
| 6,925,609 B1 | 8/2005 | Lucke | |
| 6,944,829 B2 * | 9/2005 | Dando .......................... | 715/798 |
| 6,986,145 B2 | 1/2006 | Gangopadhyay | |
| 7,185,333 B1 | 2/2007 | Shafron | |
| 7,707,505 B1 | 4/2010 | Ohrt et al. | |
| 8,234,575 B2 | 7/2012 | Hartin | |
| 2002/0057299 A1 | 5/2002 | Oren et al. | |
| 2003/0009768 A1 * | 1/2003 | Moir .............................. | 725/112 |
| 2003/0050834 A1 * | 3/2003 | Caplan ........................... | 705/14 |
| 2003/0080995 A1 * | 5/2003 | Tenenbaum et al. ........... | 345/738 |
| 2003/0140242 A1 | 7/2003 | Barton et al. | |
| 2003/0202009 A1 | 10/2003 | Kasriel | |
| 2004/0061720 A1 | 4/2004 | Weber | |
| 2004/0186775 A1 * | 9/2004 | Margiloff et al. ............... | 705/14 |
| 2004/0234049 A1 | 11/2004 | Melideo | |
| 2005/0039144 A1 | 2/2005 | Wada et al. | |
| 2005/0097008 A1 | 5/2005 | Ehring et al. | |
| 2005/0172262 A1 | 8/2005 | Lalwani | |
| 2005/0177803 A1 | 8/2005 | Ruthfield et al. | |

(Continued)

FOREIGN PATENT DOCUMENTS

WO   WO2005111846 A1   11/2005

OTHER PUBLICATIONS

Tullett, "Nsauditor", 2005, SC Magazine, pp. 1-2.

(Continued)

*Primary Examiner* — William Bashore
*Assistant Examiner* — Gregory A Distefano
(74) *Attorney, Agent, or Firm* — Wolfe-SBMC

(57) ABSTRACT

A determination of when to change a toolbar pane of a toolbar being displayed in a Web browser window is automatically made. A set of rules identifying which of multiple toolbar panes are to be displayed under different conditions is accessed, and one of the multiple toolbar panes is automatically determined based at least in part on the set of rules. This toolbar pane that was automatically determined is displayed in the toolbar of the web browser window.

15 Claims, 10 Drawing Sheets

U.S. PATENT DOCUMENTS

| | | |
|---|---|---|
| 2005/0193340 A1 | 9/2005 | Amburgey et al. |
| 2005/0198220 A1 | 9/2005 | Wada et al. |
| 2005/0228825 A1 | 10/2005 | Yang |
| 2005/0234891 A1 | 10/2005 | Walther et al. |
| 2006/0059128 A1 | 3/2006 | Ruggle et al. |
| 2006/0095860 A1 | 5/2006 | Wada et al. |
| 2006/0101341 A1 | 5/2006 | Kelly et al. |
| 2006/0123356 A1 | 6/2006 | Sobeski et al. |
| 2006/0155728 A1 | 7/2006 | Bosarge |
| 2006/0178900 A1 | 8/2006 | Shilo et al. |
| 2006/0190441 A1 | 8/2006 | Gross et al. |
| 2006/0282795 A1 | 12/2006 | Clark et al. |
| 2007/0016875 A1 | 1/2007 | Santos-Gomez |
| 2007/0050722 A1 | 3/2007 | Schulz et al. |
| 2007/0074116 A1 | 3/2007 | Thomas |
| 2007/0136263 A1 | 6/2007 | Williams |
| 2007/0150516 A1 | 6/2007 | Morgan et al. |
| 2007/0157118 A1 | 7/2007 | Wuttke |
| 2007/0208840 A1 | 9/2007 | McConville et al. |
| 2007/0245246 A1 | 10/2007 | Oren et al. |
| 2008/0005125 A1 | 1/2008 | Gaedeke |
| 2008/0005686 A1 | 1/2008 | Singh |
| 2008/0172382 A1 | 7/2008 | Prettejohn |
| 2009/0006974 A1 | 1/2009 | Harinarayan et al. |
| 2009/0132417 A1 | 5/2009 | Scipioni et al. |

OTHER PUBLICATIONS

Dunn., "WTL for MFC Programmers, Part III—Toolbars and Status Bars", Michael Dunn, 2003, pp. 1-10.

"StarOffice 8 Office Suite: Guide to New Features", Sep. 2005, Sun Microsystems, Inc., 2005, pp. 37.

"Google Toolbar", 2007 Google, pp. 1-4.

"Cool features you get with Windows Live Toolbar", 2007, Microsoft, p. 1.

"Using the eBay Toolbar", eBay Inc, 1995-2007, pp. 1-2.

"Final Office Action", U.S. Appl. No. 11/947,800, (Jan. 5, 2011),16 pages.

"Non-Final Office Action", U.S. Appl. No. 11/947,800, (Sep. 9, 2010),13 pages.

"Non-Final Office Action", U.S. Appl. No. 11/947,800, (Nov. 10, 2011),20 pages.

"Notice of Allowance", U.S. Appl. No. 11/947,800, (Mar. 22, 2012),6 pages.

"Supplemental Notice of Allowance", U.S. Appl. No. 11/947,800, (May 3, 2012),2 pages.

"Supplemental Notice of Allowance", U.S. Appl. No. 11/947,800, (Jul. 6, 2012),2 pages.

* cited by examiner

RULE-BASED MULTI-PANE TOOLBAR DISPLAY

BACKGROUND

Use of the Internet and the World Wide Web (or simply the Web) has become commonplace throughout the world. Typically, users of a computing device use a Web browser to access information that is made available via Web pages on the Internet. These Web pages are displayed in the Web browser, and the user can navigate to different Web pages to retrieve different information. The Web browser oftentimes includes one or more toolbars having different user-selectable buttons allowing the user to select different information to be displayed and/or functions to be performed. Multiple different toolbars can be displayed concurrently, each of which occupies space on the display. These toolbars can be problematic, however, due to the amount of space they occupy—as more toolbars are displayed concurrently the amount of space available on the display in which the Web pages can be displayed is reduced.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the rule-based multi-pane toolbar display, when to change a toolbar pane of a toolbar being displayed in a Web browser window is automatically determined. A set of rules identifying which of multiple toolbar panes are to be displayed under different conditions is accessed, and one of the multiple toolbar panes is automatically determined based at least in part on the set of rules. This toolbar pane that was automatically determined is displayed in the toolbar of the web browser window.

In accordance with one or more aspects of the rule-based multi-pane toolbar display, a description of a pane for a toolbar that is to be displayed in a Web browser window of one or more devices is generated. The description of the pane identifies multiple toolbar buttons and, for each toolbar button, one or more actions to occur when the toolbar button is selected. One or more rules corresponding to the pane are also generated, these rule(s) identifying under what conditions the pane is to be displayed in the toolbar. The description of the pane and these rule(s) corresponding to the pane are made available to each of the one or more devices.

BRIEF DESCRIPTION OF THE DRAWINGS

The same numbers are used throughout the drawings to reference like features.

DETAILED DESCRIPTION

A rule-based multi-pane toolbar display is discussed herein. A toolbar for a Web browser is displayed to the user of the computing device. Multiple different panes can be displayed in the toolbar, allowing the content displayed to the user via the toolbar to change but the location of the toolbar and the display area occupied by the toolbar to remain unchanged. A determination of when to change the toolbar pane being displayed can be based on different criteria, such as when the user navigates to a different domain or Web page, after a particular amount of time has passed, and so forth. Additionally, each toolbar pane has an associated set of one or more rules, and these sets of rules are used to determine which toolbar pane is displayed at any given time.

Figure 1:
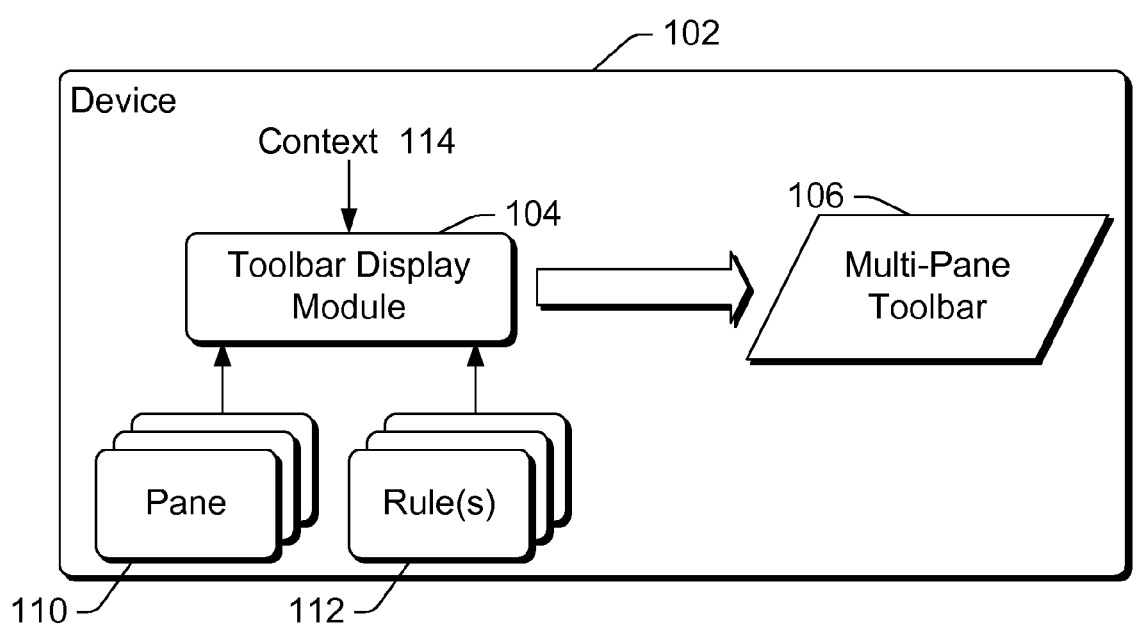
FIG. 1 illustrates an example system using the rule-based multi-pane toolbar display in accordance with one or more embodiments.

FIG. 1 illustrates an example system 100 using the rule-based multi-pane toolbar display in accordance with one or more embodiments. System 100 includes a device 102 having a toolbar display module 104 that generates a multi-pane toolbar 106. Device 102 can be any of a variety of different devices that can display Web pages, such as a desktop computer, notebook computer, handheld computer, server computer, cellular phone, personal digital assistant (PDA), game console, automotive PC, and so forth.

Toolbar display module 104 receives toolbar panes 110, toolbar pane rules 112, and optionally context information 114. Toolbar display module 104 uses panes 110, rules 112, and optionally context information 114 to determine the particular toolbar pane to display as toolbar 106 at any given time. Multi-pane toolbar 106 is dynamic in that the displayed toolbar can change over time, being changed based on rules 112 and/or context information 114 as discussed in more detail below. Toolbar display module 104 is typically a component of a Web browser application running on device 102, and multi-pane toolbar 106 is typically displayed as part of a Web browser window displayed by the Web browser application.

Multi-pane toolbar 106 generally occupies the same location and display area in a Web browser, although different panes 110 are displayed in toolbar 106 at different times. These different panes 110 allow different information to be displayed to the user via the toolbar. Each toolbar pane 110 can include one or more toolbar buttons via which content, functions, operations, and so forth can be exposed to the user. Toolbar buttons can be associated with any of a variety of different information, such as entertainment news, national and/or local news, international news, science, technology, video games, movies, books, music, travel, horoscopes, personal finance, and so forth. Toolbar buttons can also be associated with different operations or functions, such as saving a Web page, printing a Web page, accessing a friends or buddies list, navigating to a particular Web page, accessing a brokerage or bank account, and so forth.

The pane displayed in multi-pane toolbar 106 at any given time is determined based on rules 112, as discussed in more detail below. Different criteria can be used to automatically determine when the pane displayed in toolbar 106 is to be changed. This criteria can include particular events, such as a particular Web page or domain being accessed, execution of a particular application beginning or ending, being logged into or out of a particular service, and so forth. This criteria can also be time based, such as being changed after a threshold amount of time (e.g., every thirty seconds) has elapsed, being changed after a Web page has been displayed for a threshold amount of time (e.g., every sixty seconds) has elapsed without any user-selection of a toolbar button or Web page link, and so forth.

Figure 2:
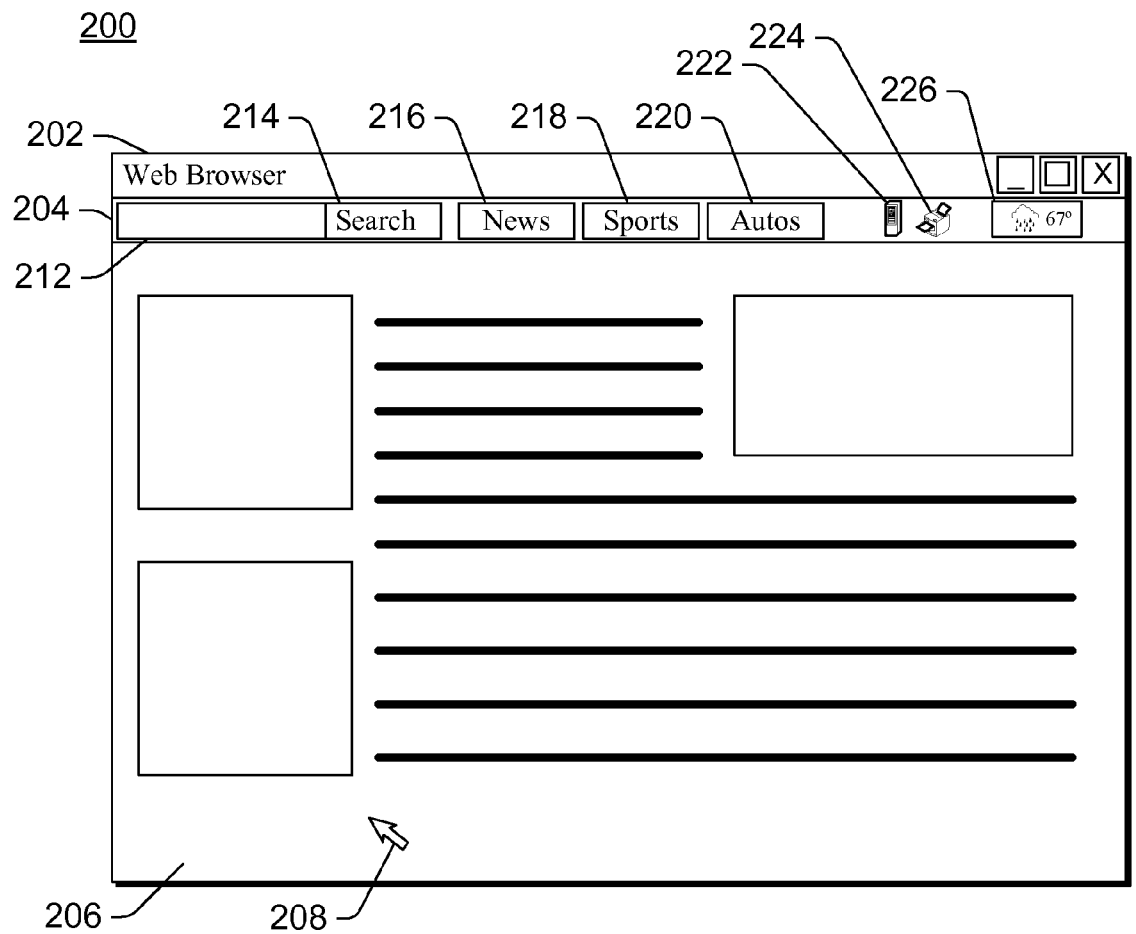
FIG. 2 illustrates an example display including a rule-based multi-pane toolbar display in accordance with one or more embodiments.

FIG. 2 illustrates an example display 200 including a rule-based multi-pane toolbar display in accordance with one or more embodiments. In display 200, a Web browser window 202 displays a multi-pane toolbar 204 and a Web page 206. Web page 206 can include any of a variety of different information, such as text (displayed as horizontal lines in Web page 206) and images (displayed as boxes in Web page 206). The display of Web page 206 is independent of the display of toolbar 204—Web page 206 and toolbar 204 are two separate components displayed by a Web browser application in window 202.

Web browser window 202 is displayed for a particular Web browsing session. A Web browsing session (or browsing session) refers to the running of a Web browser application that displays Web browser window 202. When Web browser window 202 is displayed, the user can navigate to or surf to one or more different Web pages, and then typically closes browser window 202 which stops running the Web browser application. A new browsing session begins each time the user again runs the Web browser application. Multi-pane toolbar 204 persists in Web browser window 202 across multiple Web pages during a browsing session. Although multi-pane toolbar 204 persists across multiple Web pages during a browsing session, the different panes having different toolbar buttons can be displayed in toolbar 204 during a browsing session (and even during the display of a Web page), as discussed in more detail below.

Also illustrated in display 200 is a cursor 208. Cursor 208 can take any of a variety of forms and can be moved around display 200 using any of a variety of different cursor control devices. The user can move cursor 208 around window 202 and select a particular portion (e.g., one of the buttons in multi-pane toolbar 204 discussed below) using the cursor control device (e.g., clicking a mouse button, pressing an "enter" or "select" button, and so forth). A particular portion can also be selected by moving a cursor over the particular portion and leaving the cursor over that particular portion for an amount of time (also referred to as "hovering"). Cursors and cursor control devices are well known to those skilled in the art and thus will not be discussed further.

Selection of a button or other portion of a toolbar being displayed is discussed herein. Such a selection can be made in any of a variety of different manners. In one or more embodiments, a selection is made using a cursor and cursor control device as discussed above. Alternatively, directional keys or a tab key can be used to cycle through different portions (e.g., different buttons in multi-pane toolbar 204), and the portions can be changed (e.g., highlighted) to show when they are being selected. An "enter" key can optionally be used to select a particular one of those portions. Alternatively other selection mechanisms can be used, such as function keys, particular alphanumeric key sequences, and so forth.

Multi-pane toolbar 204 includes a search box 212 and search button 214, a news button 216, a sports button 218, an autos button 220, a save button 222, a print button 224, and a weather button 226. It is to be appreciated that the toolbar buttons illustrated in FIG. 2 (as well as the buttons illustrated in FIGS. 3 and 4 discussed below) are only examples, and that the toolbar can be comprised of any set of buttons.

Search box 212 is a data entry box via which a user can enter (e.g., using a keyboard or other data entry device) one or more search terms. After entry of the search term(s), the user can select button 214. Selection of button 214 causes the search terms entered in search box 212 to be communicated to a search engine (typically on a remote server accessed via the Internet), and the results of the search being displayed to the user as a new Web page 206 in browser window 202.

One or more toolbar buttons included in a pane of toolbar 204 can have additional associated content that is displayed when the button is selected by a user. For example, news content can be displayed when news button 216 is selected, sports content can be displayed when sports button 218 is selected, and automotive content can be displayed when autos button 220 is selected. The particular content that is associated with or corresponds to each toolbar button can vary over time. This additional content is obtained when the toolbar pane is defined and can optionally be subsequently updated, as discussed in more detail below.

Some toolbar buttons, such as buttons 216, 218, and 220, display headings or information describing the additional content that is available when the button is selected. Other toolbar buttons, such as button 226, themselves display additional information to the user automatically and without the user having to select these buttons. For example, weather button 226 displays weather information (e.g., indicating it is currently rainy and the current temperature is 67 degrees). In addition to displaying information themselves, informational buttons such as button 226 can also have additional associated content that is displayed when the button is selected by a user. For example, additional local and/or national weather, weather-related news stories, and so forth can be displayed when weather button 226 is selected by a user.

The additional content that is displayed when a toolbar button is selected can be displayed in any of a variety of different manners. In one or more embodiments, an additional window is displayed whenever a toolbar button is selected. The additional content is displayed within this additional window.

One or more toolbar buttons included in a pane of toolbar 204 can be operation or functionality buttons. When an operation or functionality button is selected by a user, the particular operation or functionality associated with the selected button is carried out by the Web browser application. For example, selection of save button 222 causes the Web browser application to save a copy of Web page 206 (optionally opening a save dialog box allowing the user to select where the copy is to be saved, a format in which the copy is to be saved, and so forth). By way of another example, selection of print button 224 causes the Web browser application to print a hard copy of Web page 206 (optionally opening a print dialog box allowing the user to select a particular printer to user, particular pages to be printed, and so forth).

Figure 3:
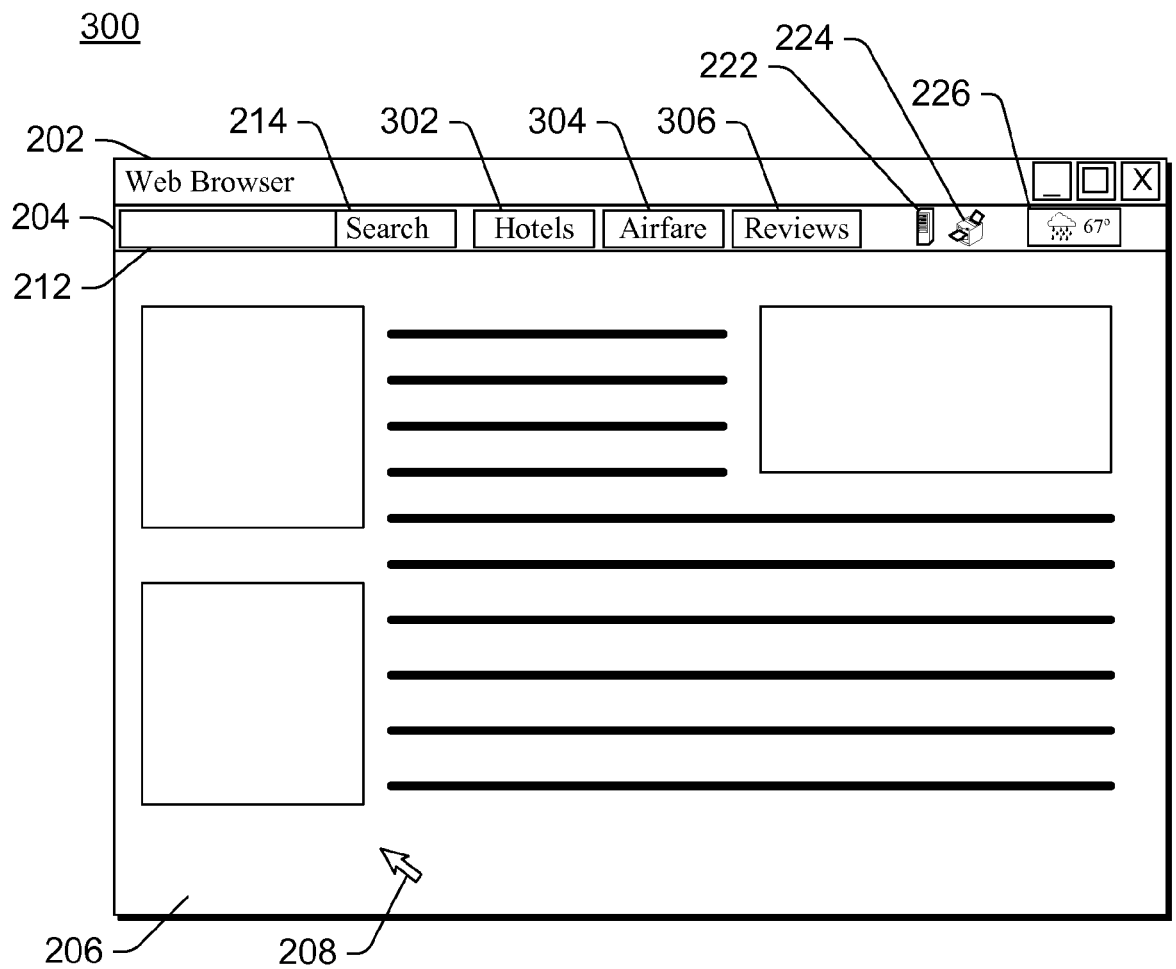
FIG. 3 illustrates an example display including another example pane being displayed in the multi-pane toolbar in accordance with one or more embodiments.

FIG. 2 illustrates an example display including a multi-pane toolbar displaying one pane. However, the particular pane that is displayed can change over time. FIG. 3 illustrates an example display 300 including another example pane being displayed in the multi-pane toolbar in accordance with one or more embodiments. In display 300, a Web browser window 202 displays a multi-pane toolbar 204 and a Web page 206, analogous to display 200 of FIG. 2.

However, in FIG. 3, news button 216, sports button 218, and autos button 220 are no longer displayed. In their place, hotels button 302, airfare button 304, and reviews button 306 are displayed. Additional content can be associated with each of buttons 302, 304, and 306, and this additional content can be displayed when the corresponding button 302, 304, or 306 is selected. For example, information regarding highly rated hotels can be displayed when hotels button 302 is selected, information regarding current airfares between particular cities can be displayed when airfare button 304 is selected, and reviews of different hotels or cities can be displayed when reviews button 306 is selected.

As illustrated in FIG. 3, the pane of toolbar 204 has changed although Web page 206 has not changed. Alternatively, the pane of toolbar 204 could have been changed in response to a change in the Web page 206 being displayed, as discussed in more detail below.

Figure 4:
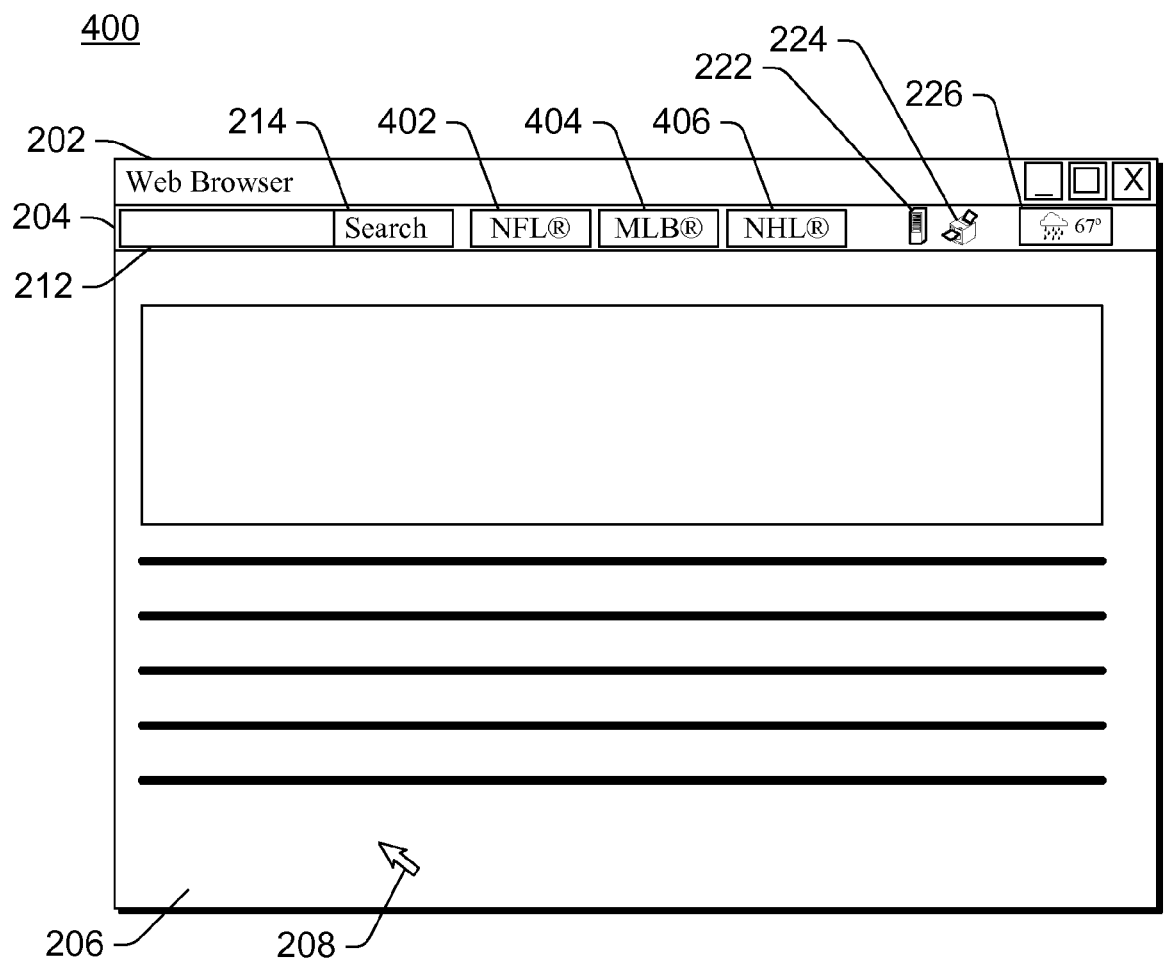
FIG. 4 illustrates an example display including another example pane being displayed in the multi-pane toolbar in accordance with one or more embodiments.

FIG. 4 illustrates an example display 400 including another example pane being displayed in the multi-pane toolbar in accordance with one or more embodiments. In display 400, a Web browser window 202 displays a multi-pane toolbar 204 and a Web page 206, analogous to display 200 of FIG. 2.

However, in FIG. 4, news button 216, sports button 218, and autos button 220 are no longer displayed. In their place, NFL® button 402, MLB® button 404, and NHL® button 406 are displayed. Additional content can be associated with each of buttons 402, 404, and 406, and this additional content can be displayed when the corresponding button 402, 404, or 406 is selected. For example, information regarding professional football can be displayed when NFL® button 402 is selected, information regarding professional baseball can be displayed when MLB® button 404 is selected, and information regarding professional hockey can be displayed when NHL® button 406 is selected.

As illustrated in FIG. 4, both the pane of toolbar 204 and Web page 206 have changed. Web page 206 can be, for example, a Web page including various sports information, and the pane of toolbar 204 can be changed to include buttons 402, 404, and 406 due to the sports theme of Web page 206.

Returning to FIG. 1, toolbar panes 110 are a collection of toolbar panes that are initially obtained from one or more different sources, such as from different Web pages via the Internet. Alternatively, a pane(s) 110 can be obtained from other sources, such as from a manufacturer of device 102, from a provider of another application (e.g., as part of an operating system installed on device 102), and so forth. Each pane 110 can be obtained from a different source, or alternatively multiple panes 110 can be obtained from the same source. Once obtained from their source(s), the toolbar panes are maintained as panes 110 in a store of device 102. Alternatively, panes 110 can be maintained in locations other than locally at device 102, such as on a removable storage device, on a remote server accessed via the Internet and/or a local area network, and so forth.

In one or more embodiments, toolbar display module 104 displays one pane in toolbar 106 at a time. Alternatively, multiple different toolbar panes can be displayed concurrently. Which toolbar pane(s) is to be displayed in toolbar 106 at any given time is determined based at least in part on rules 112.

As discussed above, when a toolbar button is selected by a user a particular action occurs. This particular action can be displaying additional content to the user, performing a particular operation or functionality, and so forth. The action that occurs can be defined in different manners. In one or more embodiments an indication of the action that is to occur is included with the toolbar pane description and is stored with the pane 110. Alternatively, one or more toolbar buttons in a pane 110 can include references to where the action that is to occur is described, such as a name of a markup language file describing the action.

In one or more embodiments, the particular action performed when a toolbar button is selected can change over time. Different sources can supply indications of such changes to device 102. For example, the additional content displayed to a user when a toolbar button is selected can change frequently if the toolbar button is a news button. This additional content can be supplied to device 102 in a variety of different manners. For example, device 102 can access a known location (e.g., a location configured into toolbar display module 104, a location identified in the description of pane 110, etc.) to obtain up-to-date additional content corresponding to the toolbar button. By way of another example, device 102 can receive a content feed, such as by subscribing to an RSS feed (RSS feeds refer to, for example, Really Simple Syndication feeds, RDF Site Summary feeds, or Rich Site Summary feeds), with the received content being the additional content corresponding to the toolbar button. The particular feeds can be known to toolbar display module 104 (e.g., module 104 can be configured with default feeds), the feeds can be identified in the description of the pane 110, and so forth.

Rules 112 are initially obtained from one or more different sources, such as from different Web pages via the Internet. In one or more embodiments, one or more rules 112 are obtained when a pane 110 is obtained and are obtained from the same source as that pane 110. Alternatively, a rule(s) 112 can be obtained from other sources, such as from a manufacturer of device 102, from a provider of another application (e.g., as part of an operating system installed on device 102), and so forth. Additionally, a user of device 102 can define particular rules 112. For example, a user of device 102 can identify a particular pane(s) that he or she desires to have displayed under certain circumstances, such as when he or she is logged into a particular service or when he or she access a particular Web page or domain (e.g., allowing the user to identify a particular Web page or domain that is to be associated with a particular pane).

Each rule 112 can be obtained from a different source, or alternatively multiple rules 112 can be obtained from the same source. Once obtained from their source(s), the rules are maintained as rules 112 in a store of device 102. Alternatively, rules 112 can be maintained in locations other than locally at device 102, such as on a removable storage device, on a remote server accessed via the Internet and/or a local area network, and so forth.

Rules 112 are used to determine which toolbar pane(s) is displayed at any given time. Rules 112 can be any of a variety of different rules, and optionally employ context information 114. Rules 112 typically identify, for a particular set of one or more conditions (which can be provided as context information 114), which pane 110 is to be displayed in toolbar 106. Rules 112 can be one or more of time-based rules, occurrence-based rules, domain-based rules, application-based, service-based rules, location-based rules, button-based rules, and so forth.

Time-based rules are rules that describe particular times and/or days during which a particular pane(s) is or is not to be displayed. For example, a time-based rule can identify a particular pane that is or is not to be displayed during regular business hours, on Friday nights, during school hours, on weekdays, on weekends, on particular dates (e.g., July 4, December 25, etc.), and so forth.

Occurrence-based rules are rules that describe a frequency with which a particular pane(s) is to be displayed. For example, an occurrence-based rule can identify that a first pane is to be displayed every $100^{th}$ time a particular Web page is accessed and that a second pane is to be displayed the other 99 times.

Domain-based rules are rules that describe which pane is to be displayed when a particular Web page is accessed. For example, different Web pages can be associated with a particular pane(s) to be displayed whenever that Web page is displayed by the Web browser, different domains can be associated with a particular pane(s) to be displayed whenever a Web page in that domain is displayed by the Web browser, and so forth.

Application-based rules are rules that describe which pane is or is not to be displayed given particular applications that are installed and/or running on a device. For example, a particular pane is or is not to be displayed if a particular application is installed on the device, if a particular application is installed and currently running on the device, and so forth.

Service-based rules are rules that describe which pane is or is not to be displayed given particular services that the user of the device is currently logged into or currently has active. For example, a particular pane is or is not to be displayed if the user is logged into an instant message application, if the user is logged into a social network Web site, if the user is logged into a photo-sharing Internet service, if the user is logged into a music-sharing Internet service, if the user is logged into a web-based email service, and so forth.

Location-based rules are rules that describe which pane is or is not to be displayed given a particular location of the device. The location can be determined in any of a variety of different manners, such as being input by the user, being determined from a global positioning system (GPS) component of the device, and so forth. For example, a particular pane is or is not to be displayed if the device is currently at home, if the device is currently at work, if the user is currently within a particular range of a given longitude and latitude, and so forth.

Button-based rules are rules that describe an ordering for particular toolbar buttons and/or panes. For example, a particular toolbar button is or is not to be displayed next to a particular other toolbar button, a particular pane is or is not to be placed next to another pane if multiple panes are displayed concurrently, and so forth.

In one or more embodiments, rules 112 identify a single pane that is to be displayed in toolbar 106. Alternatively, situations can arise where the application of rules 112 identify multiple panes that can be displayed in toolbar 106 at any given time. Such situations can be resolved in different manners. In one or more embodiments, the multiple panes are displayed in toolbar 106 concurrently. In other embodiments, the different panes are ranked in order of priority and the highest ranking pane(s) is displayed in toolbar 106. The priority rankings can be assigned in different manners, such as by the creator(s) of the rule(s) 112, the creator(s) of the pane(s), according to an algorithm applied by toolbar display module 104 (e.g., panes identified by domain-based rules higher priority than panes identified by location-based rules), and so forth. It should be noted, however, in situations where multiple panes or toolbar buttons from multiple panes are displayed concurrently in toolbar 106, the area and location occupied by toolbar 106 in the web browser window typically does not change.

Additionally, situations can arise where all the buttons that are defined for a toolbar pane cannot be displayed in the display area for toolbar 106. Such situations can arise, for example, where the Web browser window is smaller than expected and thus the display area for toolbar 106 is smaller than expected. Such situations can also arise where multiple toolbar panes are displayed concurrently and there is insufficient space in the display area for toolbar 106 for all of the buttons of all of the multiple toolbar panes.

These situations where all the buttons that are defined for a toolbar pane cannot be displayed in the display area for toolbar 106 can be resolved in different manners. In one or more embodiments, one or more rules 112 (e.g., button-based rules) identify which toolbar buttons are of higher priority and thus are to be displayed before those of lower priority. In other embodiments, other rules 112 or algorithms of toolbar display module 104 determine which toolbar buttons are to be displayed. For example, all the buttons of the toolbar pane having the higher priority are displayed and then as many of the buttons of the lower priority pane(s) as will fit in the display area are displayed. By way of another example, the buttons of the toolbar pane can be displayed in the order in which they are defined in a file describing the toolbar pane until the display area is filled. By way of yet another example, the buttons of the toolbar pane can be displayed in an order that is picked in some other manner, such as randomly, based on how frequently the buttons have been selected by the current user or users in generally, and so forth.

Toolbar display module 104 also optionally receives context information 114. Context information 114 refers to any information regarding the user's current use of device 102. This can include information regarding the Web pages and/or Web domain being accessed by the user, such as the Web page the user is currently viewing, the Web pages the user has viewed during the current browsing session and/or during a preceding amount of time (e.g., during the last 30 minutes), and so forth. This can also include information regarding the user's current location, such as a location derived based on the Internet Protocol (IP) address of device 102, global positioning system (GPS) coordinates describing the location of device 102, and so forth. This can further include information regarding the current date, the current time, applications installed on device 102, other applications running on device 102, services that the user is currently logged into, and so forth. Context information 114 is used by toolbar display module 104 in applying rules 112 discussed above.

Context information 114 can be obtained in a variety of different manners. For example, context information 114 can be obtained by accessing a registry or other record of installed applications, a registry or other record of running applications, a registry or other record of services currently logged into, a Uniform Resource Locator (URL) of the Web page currently being displayed by the Web browser application, and so forth. By way of other examples, context information 114 can be identified by accessing system hardware or software resources, such as a current time, a current date, a current GPS location, and so forth. By way of still other examples, context information 114 can be specified by the user, such as preference or configuration option settings input by the user to identify the user's favorite sports teams, the user's favorite stocks, the user's favorite travel destinations, the user's age, the user's location (e.g., by zip code), and so forth.

Figure 5:
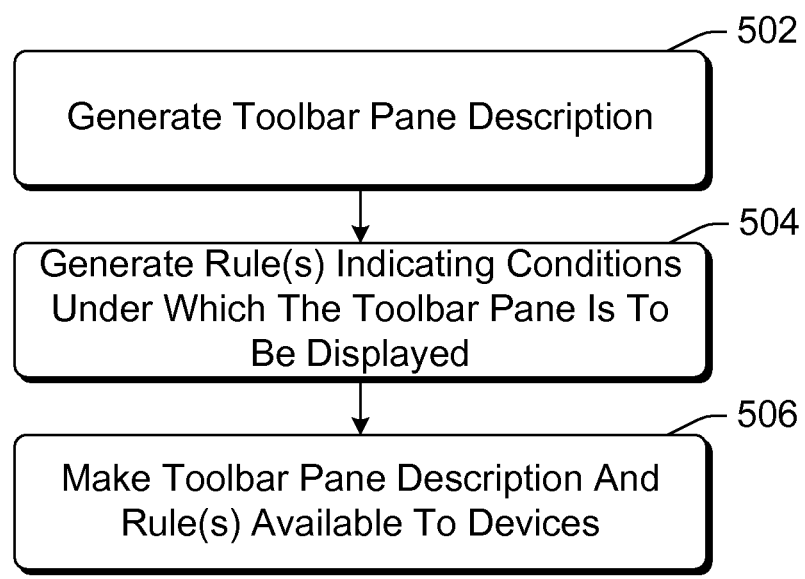
FIG. 5 is a flowchart illustrating an example process for generating a toolbar pane description and corresponding rules in accordance with one or more embodiments.

FIG. 5 is a flowchart illustrating an example process 500 for generating a toolbar pane description and corresponding rules in accordance with one or more embodiments. Process 500 can be implemented in software, firmware, hardware, or combinations thereof. Process 500 can be carried out by any of a variety of computing devices.

Initially, a toolbar pane description is generated (act 502). This toolbar pane description can be generated in any of a variety of different manners. The toolbar pane description includes identifiers of the different toolbar buttons that are to be displayed for the pane, as well as information describing how those toolbar buttons are to be displayed. For example, different text can be displayed inside the buttons, different images can be displayed as the buttons, different button borders can be displayed, and so forth. The toolbar pane description also includes, for each toolbar button, information describing what action is to be performed when the button is selected (e.g., additional content that is to be displayed, a particular operation or functionality that is to be performed). The action description can be included as part of this toolbar pane description, or alternatively the toolbar pane description can include a reference to another file or location that in turn defines the action.

Additionally, one or more rules indicating the conditions under which the toolbar pane is to be displayed are generated (act 504). These rules can be any of a variety of rules as discussed above.

The toolbar pane description generated in act 502 and the rules generated in act 504 are both made available to devices (act 506). In one or more embodiments, the toolbar pane description and the rules are packaged together into a single file and made available to requesting devices. Alternatively, the toolbar pane description and rules can be maintained separately and a correspondence of the relation of particular toolbar pane descriptions to particular rules maintained.

The toolbar pane description and the rules can be made available to devices in any of a variety of different manners. In one or more embodiments, a link or other user-selectable option is made available on a Web page. In response to user selection of the link or other option, the toolbar pane and description are sent to the user's device. Alternatively, the toolbar pane description and rules can be made available in other manners, such as saving the toolbar pane description and rules to a known location (e.g., a particular database or server) which can be accessed by a device, sending the toolbar pane description and rules as part of a software upgrade, and so forth.

Figure 6:
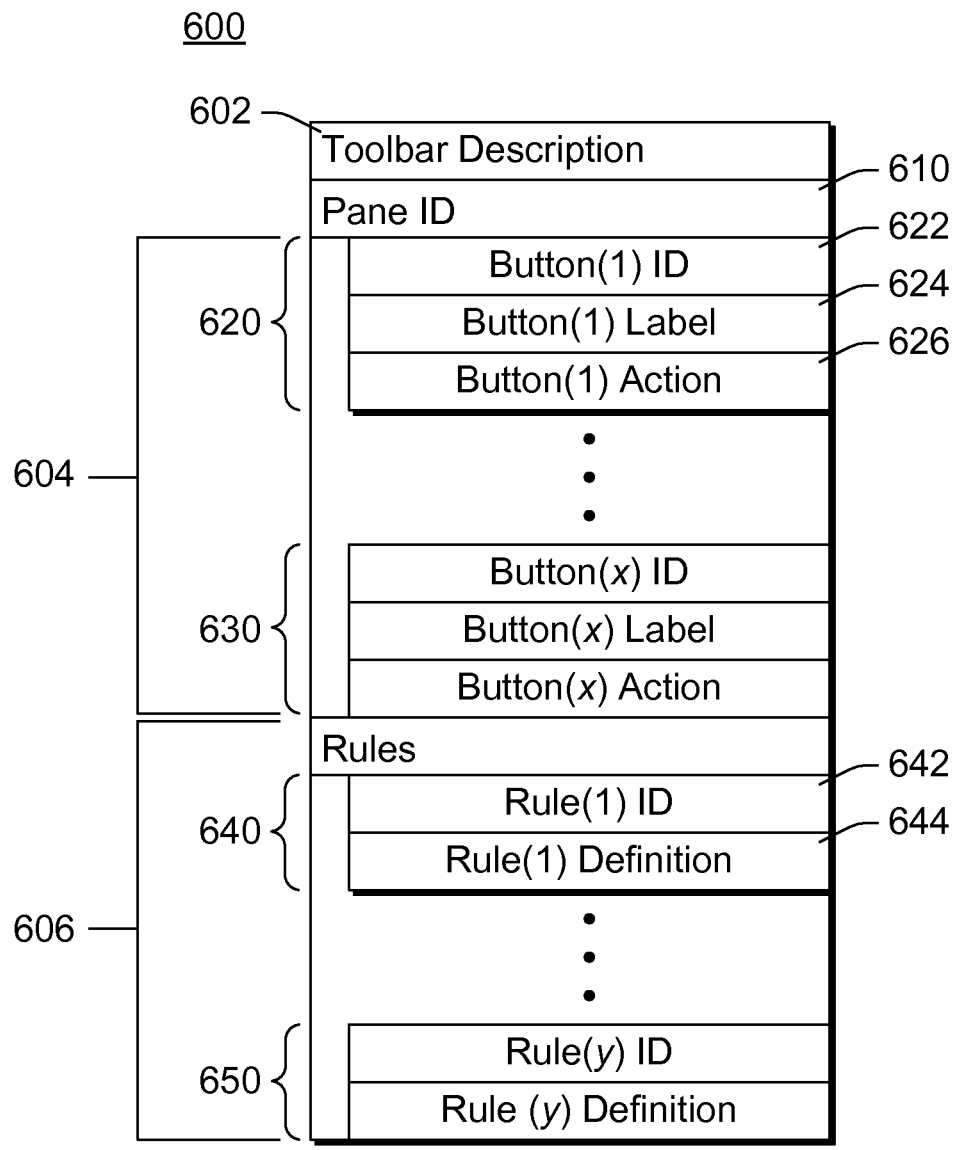
FIG. 6 illustrates an example package describing a toolbar pane and corresponding rules in accordance with one or more embodiments.

FIG. 6 illustrates an example package 600 describing a toolbar pane and corresponding rules in accordance with one or more embodiments. Package 600 can be implemented using any of a variety of public and/or proprietary formats. In one or more embodiments, package 600 is defined using a markup language, such as extensible markup language (XML). Alternatively, other languages and/or formats can be used.

Package 600 includes a toolbar description portion 602, a pane description portion 604, and a rule description portion 606. Toolbar description portion 602 describes constraints on the format of the toolbar, such as particular sizes of the toolbar, ranges of acceptable sizes of the toolbar, and so forth.

Pane description portion 604 describes one or more panes for the toolbar. A single pane description is illustrated in portion 604, although alternatively multiple pane descriptions can be included in portion 604. Pane description portion 604 includes a pane identifier portion 610, and multiple (x) button portions 620, 630. Although multiple button portions 620, 630 are illustrated in FIG. 6, alternatively only a single button portion can be included.

Pane identifier portion 610 includes an identifier (ID) of a particular pane. Each button portion 620, 630 defines a button for the toolbar pane identified in pane identifier portion 610. Button portion 620 includes a button identifier portion 622, a button label portion 624, and a button action portion 626. Button identifier portion 622 is an identifier of a button, typically uniquely identifying a particular button within the toolbar pane identified in pane identifer portion 610. Button label portion 624 defines how the button is to be displayed, such as a size of the button, text to be displayed in the button, an image(s) to be displayed as the button, a design for a border of the button, and so forth. In one or more embodiments, button label portion 624 includes an identifier of a descriptive file, such as an extensible application markup language (XAML) file, that describes how the button is to be displayed. Alternatively, the description of how the button is to be displayed can be included in button label portion 624.

Button action portion 626 defines one or more actions to be taken when the button is selected. As discussed above, such actions can include displaying additional content corresponding to the button, performing a particular function, and so forth. In one or more embodiments, button action portion 626 includes an identifier of a descriptive file, such as an XAML file, that describes the action(s) that is to be taken. Alternatively, the description of the action(s) that is to be taken can be included in button action portion 626.

Each button portion for each additional button, such as button portion 630, includes a button identifier portion, a button label portion, and a button action portion, analogous to button portion 620.

Rule description portion 606 includes multiple (y) rule portions 640, 650. Although multiple rule portions 640, 650 are illustrated in FIG. 6, alternatively only a single rule portion can be included. Each rule portion 640, 650 defines a rule corresponding to the toolbar pane identified in pane identifier portion 610 describing under what conditions the toolbar pane is to be displayed in the toolbar.

Rule portion 640 includes a rule identifier portion 642, and a rule definition portion 644. Rule identifier portion 642 is an identifier of a rule, typically uniquely identifying a particular rule corresponding to the toolbar pane identified in pane identifier portion 610. Rule definition portion 644 includes a description of the particular rule. Rule definition portion 644 can include the particular rule description, or alternatively can include an identifier of a descriptive file, such as an XML file, that describes the rule. The rule can be described using any of a variety of public and/or proprietary languages or formats.

Figure 7:
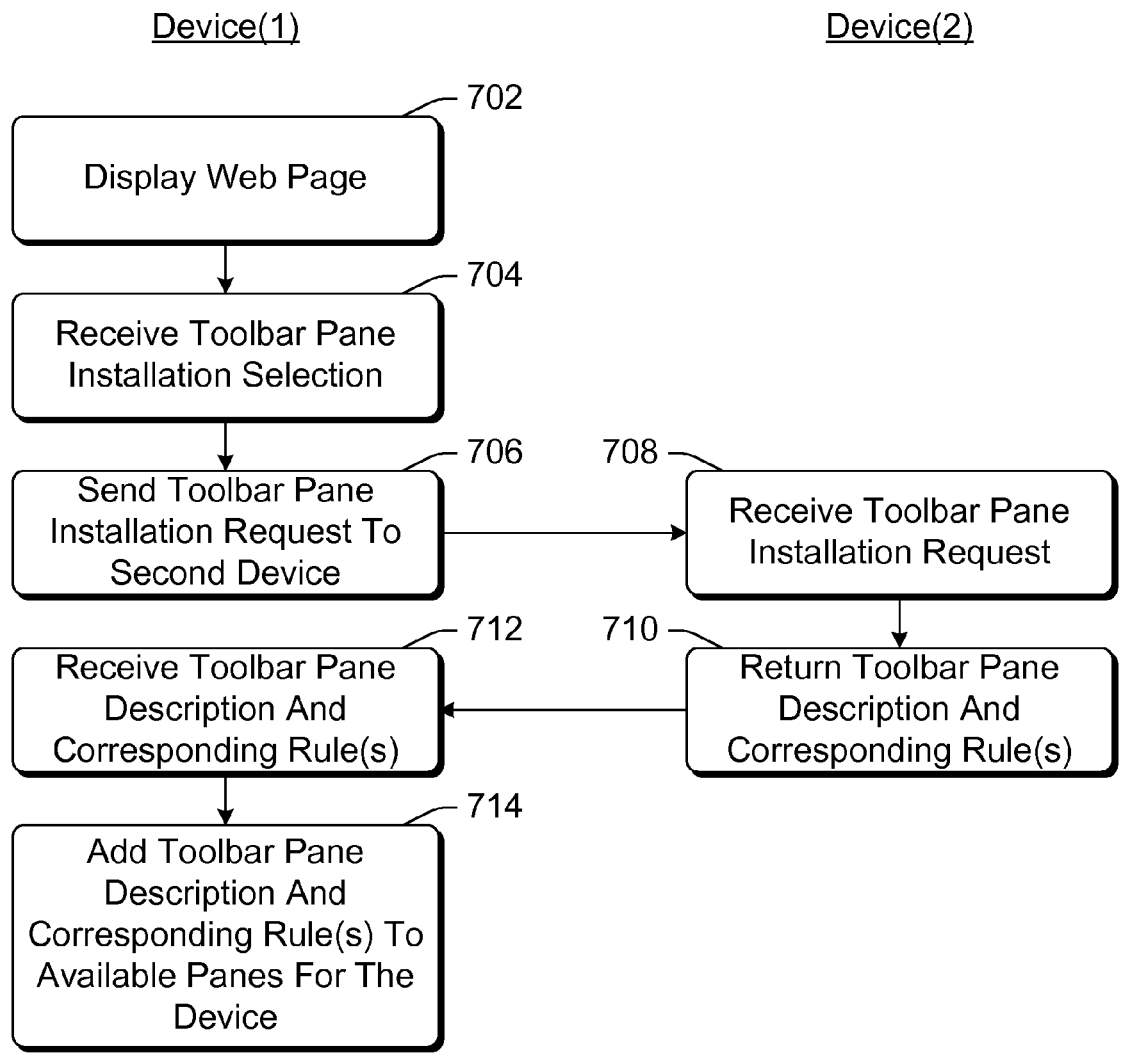
FIG. 7 is a flowchart illustrating an example process for installing toolbar panes on a device in accordance with one or more embodiments.

FIG. 7 is a flowchart illustrating an example process 700 for installing toolbar panes on a device in accordance with one or more embodiments. Process 700 can be implemented in software, firmware, hardware, or combinations thereof. Acts illustrated on the left-hand side of FIG. 7 are performed by a first device (such as device 102 of FIG. 1), and acts illustrated on the right-hand side of FIG. 7 are performed by a second device (such as a server). This second device can be any of a variety of different devices that are accessible to the first device, and in one or more embodiments this second device is a Web server hosting Web pages on the Internet.

Initially, a Web page is displayed in a Web browser of the first device (act 702). The Web page can be displayed in response to any of a variety of inputs to the web browser, such as a default page of the Web browser, a user request (e.g., while "surfing" the Web), a request from another application or Web page, and so forth.

A toolbar pane installation selection is then received (act 704). In one or more embodiments, a toolbar pane installation option is presented by the Web page being displayed in act 702. This installation option is typically a user-selectable link, although the option can alternatively be presented in different manners. In response to receiving the selection, a toolbar pane installation request is sent to the second device (act 706).

The toolbar pane installation request is received by the second device (act 708), in response to which the requested toolbar pane description and corresponding rule(s) are returned (act 710). Alternatively, rather than returning the rules, an indication of where to obtain the rules can be returned. In other embodiments, the first device is informed of where to obtain the rules in other manners, such as being pre-configured with a default location, identifying where to obtain the rules from another part of the Web page being displayed in act 702, and so forth.

The first device receives the toolbar pane description and corresponding rule(s) (act 712), and adds the received toolbar pane description and corresponding rule(s) to the available panes for the first device (act 714). For example, the received toolbar pane description becomes a pane 110 of FIG. 1, and the received rule(s) becomes a rule(s) 112 of FIG. 1. This adding of the toolbar pane description and corresponding rule(s) to the available panes for the first device is also referred to as installing the toolbar pane on the first device.

Figure 8:
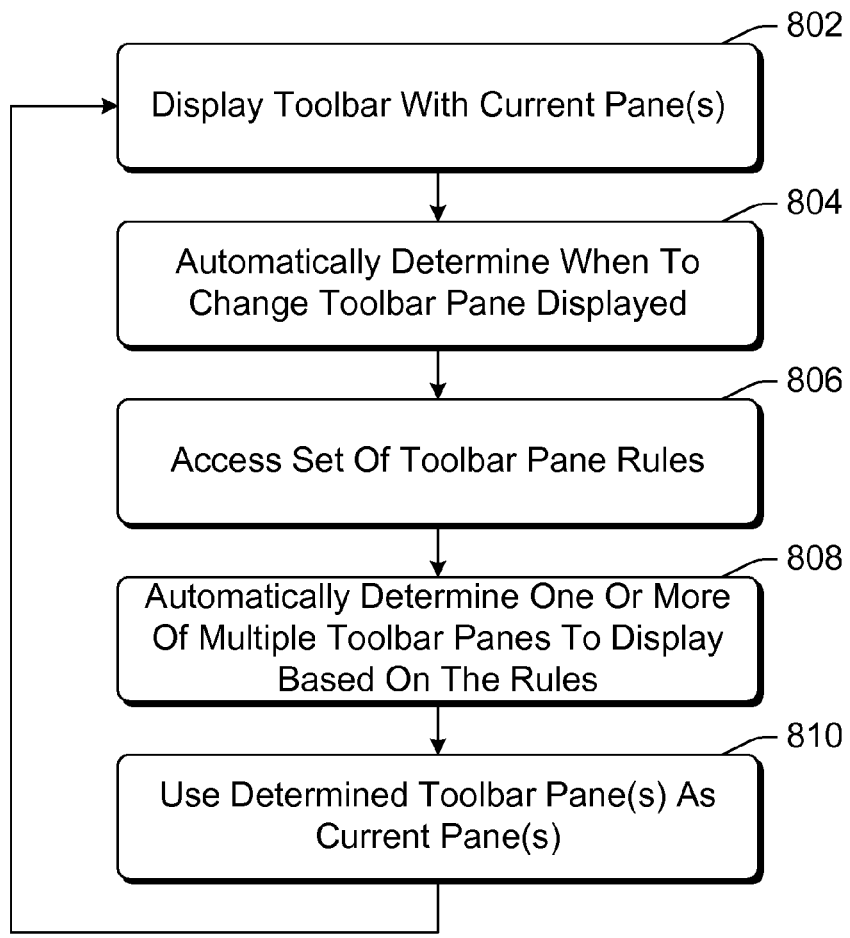
FIG. 8 is a flowchart illustrating an example process for displaying panes in a multi-pane toolbar in accordance with one or more embodiments.

FIG. 8 is a flowchart illustrating an example process 800 for displaying panes in a multi-pane toolbar in accordance with one or more embodiments. Process 800 can be implemented in software, firmware, hardware, or combinations thereof. Process 800 can be carried out by any of a variety of components or devices, such as toolbar display module 104 of device 102 of FIG. 1.

Initially, a toolbar is displayed with a current pane(s) (act 802). The toolbar is typically displayed in Web browser window, as discussed above. A default pane(s) can be displayed in the toolbar as the first pane when the Web browser application begins running, or alternatively the rules (such as rules 112 of FIG. 1) can be used to determine the first pane(s) to be displayed in the toolbar.

When to change the toolbar pane(s) displayed is automatically determined (act 802). As discussed above, this determination can be in response to particular events being detected, particular amounts of time being passed, and so forth. The determination in act 802 is referred to as being automatic because the determination can be performed without user request or intervention. The component or device implementing process 800 can determine when to change the toolbar pane being displayed based on different criteria as discussed above, rather than determining to change the toolbar pane in response to a user request to change the toolbar pane.

A set of toolbar pane rules is accessed (act 806), and these accessed rules are applied to automatically determine one or more of the multiple toolbar panes to display (act 808). Any of a variety of different rules can be used as discussed above, such as time-based rules, occurrence-based rules, domain-based rules, application-based, service-based rules, location-based rules, button-based rules, and so forth. Depending on the particular rules, context information 114 of FIG. 1 can optionally be used as an input for determining which rule(s) apply and/or how to apply the rule(s). The one or more panes determined in act 808 are then used as the current pane(s) (act 810). Process 800 then returns to act 802 to display the toolbar with the current pane(s) as determined in act 808.

Automatic determination of when to change the toolbar pane displayed is discussed above with reference to act 804. Additionally, the determination can also be performed in response to a user request to change the toolbar pane. The user could, for example, input a "select pane" request, in response to which the different installed panes (e.g., panes 110 on device 102 of FIG. 1) can be displayed to the user and the user can select from one of them. The different panes could be displayed to the user in different manners, such as in a drop-down menu or other window, by changing the pane being displayed in the toolbar (e.g., allowing the user to scroll or cycle through the different pane options one after another). The user could also identify, while scrolling through the different pane options, which toolbar pane is associated with a particular Web page or domain (e.g., by entering a URL for the Web page or domain, having the toolbar pane associated with the currently displayed Web page, and so forth). This association of toolbar pane to Web page or domain can then be included as a rule 112 of FIG. 1.

Additionally, an "undo" or "go back" option can be included to allow the user to go back to the previously displayed toolbar pane. This "undo" or "go back" option can be presented to the user in different manners, such as as a toolbar button, as a menu item, and so forth. For example, the toolbar display module may automatically change the toolbar pane in a situation where the user would prefer to have the previous toolbar pane displayed. In this situation, the user can select the "undo" or "go back" option and have the previously displayed toolbar pane displayed in the toolbar in place of the current toolbar pane being displayed. Additionally, selection of the "undo" or "go back" option can temporarily pause the automatic changing of the toolbar pane so that the user does not have to repeatedly select the "undo" or "go back" option. This temporary pausing can continue until, for example, a particular event occurs (such as the user navigating to a different Web page or domain, the user terminating execution of and re-executing the Web browser application, and so forth).

Figure 9:
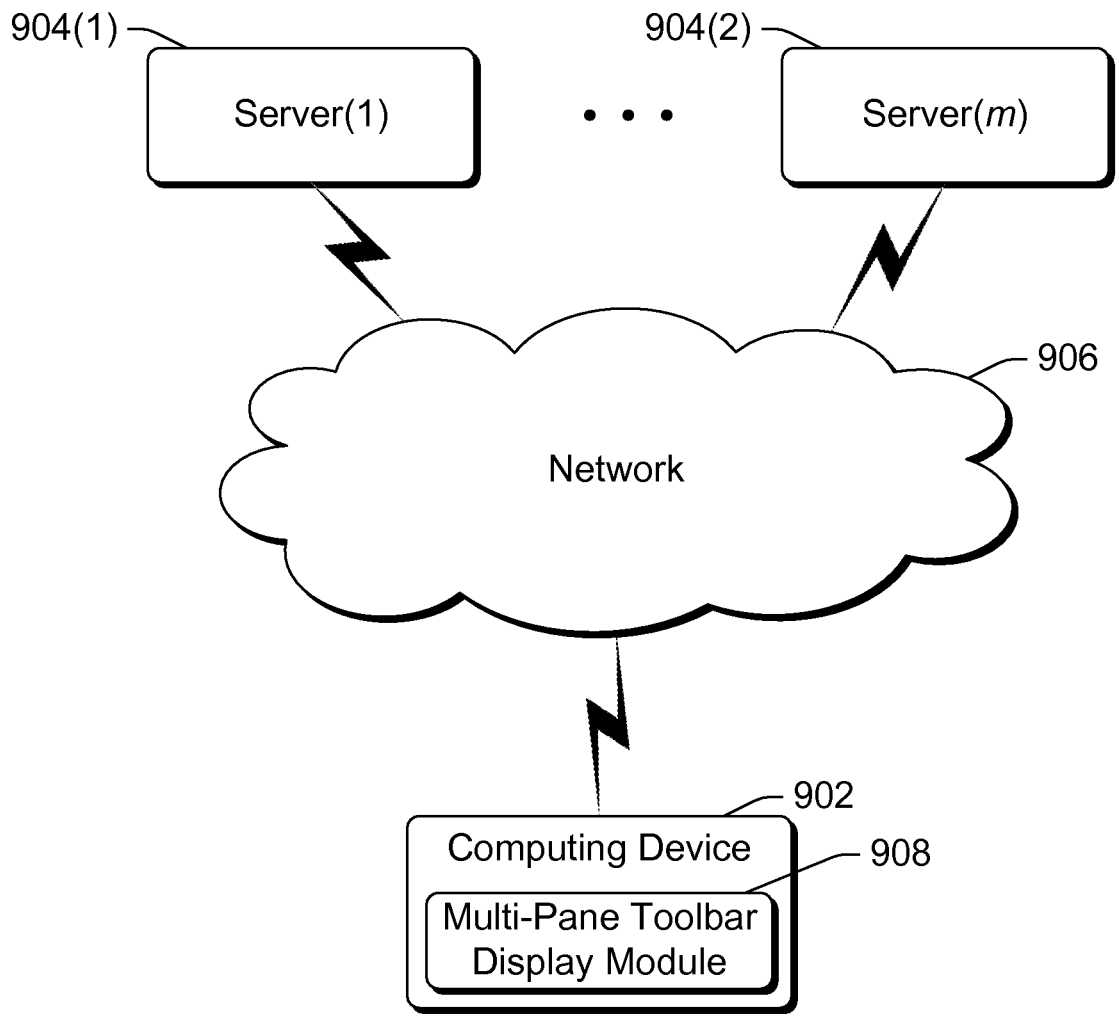
FIG. 9 illustrates an example system in which the rule-based multi-pane toolbar display can be used in accordance with one or more embodiments.

FIG. 9 illustrates an example system 900 in which the rule-based multi-pane toolbar display can be used in accordance with one or more embodiments. System 900 includes a computing device 902 that can communicate with one or more (m) servers 904 via a network 906. Network 906 can be any of a variety of networks, including the Internet, a local area network, other public and/or proprietary networks, combinations thereof, and so forth. Servers 904 can be any of a variety of different computing devices, and in one or more embodiments each server 904 is a Web server hosting Web pages that can be retrieved and displayed by a Web browser of computing device 902. Each server 904 can also include descriptions of toolbar panes and/or corresponding rules.

Computing device 902 can be any of a variety of different computing devices, such as device 102 of FIG. 1. Computing device 902 includes a multi-pane toolbar display module 908. Multi-pane toolbar display module 908 generates a toolbar displaying different toolbar panes as discussed above. Multi-pane toolbar display module 908 can be, for example, toolbar display module 104 of FIG. 1.

Figure 10:
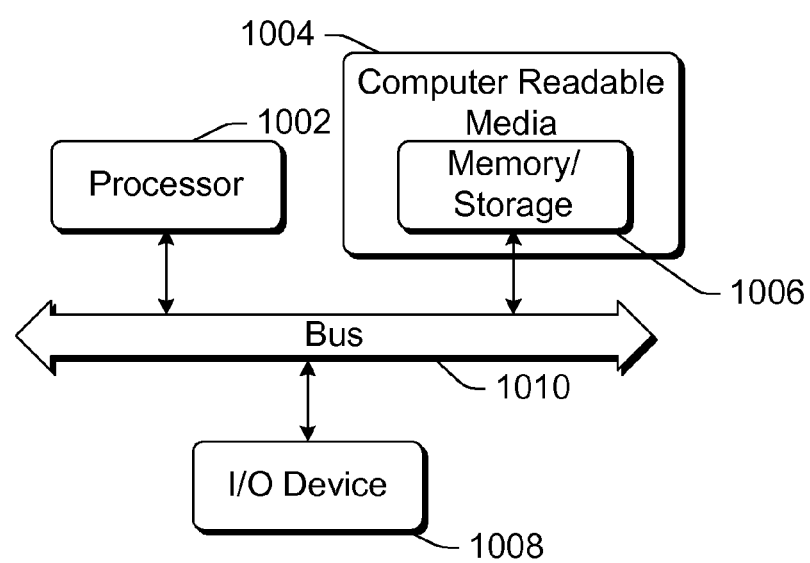
FIG. 10 illustrates an example computing device that can be configured to implement the rule-based multi-pane toolbar display in accordance with one or more embodiments.

FIG. 10 illustrates an example computing device 1000 that can be configured to implement the rule-based multi-pane toolbar display in accordance with one or more embodiments. Computing device 1100 can be, for example, device 102 of FIG. 1, computing device 902 of FIG. 9, or a server 904 of FIG. 9. Computing device 1000 can implement any of the techniques and processes discussed herein.

Computing device 1000 includes one or more processors or processing units 1002, one or more computer readable media 1004 which can include one or more memory and/or storage components 1006, one or more input/output (I/O) devices 1008, and a bus 1010 that allows the various components and devices to communicate with one another. Computer readable media 1004 and/or I/O device(s) 1008 can be included as part of, or alternatively may be coupled to, computing device 1000. Bus 1010 represents one or more of any of several types of bus structures, including a memory bus or memory controller, a peripheral bus, an accelerated graphics port, and a processor or local bus using any of a variety of bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit 1002. It is to be appreciated that different instructions can be stored in different components of computing device 1000, such as in processing unit 1002, in various cache memories of processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the advertisement-controlled Web page customization techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    automatically determining, at a computing device, when a toolbar pane of a toolbar being displayed in a Web browser window is to be changed;
    accessing a set of rules identifying which of multiple toolbar panes are to be displayed under different conditions, the set of rules comprising:
        time-based rules that control display of one or more of the multiple toolbar panes based on particular times or days,
        occurrence-based rules that control a frequency of display of one or more of the multiple toolbar panes,
        domain-based rules that control display of one or more of the multiple toolbar panes based on one or more web pages being accessed,
        application-based rules that control display of one or more of the multiple toolbar panes based on one or more applications that are installed or running on the computing device,
        service-based rules that control display of one or more of the multiple toolbar panes based on one or more services that a user of the computing device is logged into or using, and
        location-based rules that control display of one or more of the multiple toolbar panes based on a location of the computing device;
    automatically determining, based at least in part on the set of rules, one toolbar pane of the multiple toolbar panes;
    displaying the one toolbar pane in the toolbar of the Web browser window, the one toolbar pane including multiple toolbar buttons;
    receiving a user selection of an undo option for the toolbar pane; and
    displaying, in place of the one toolbar pane, a previous toolbar pane that was being displayed prior to the toolbar pane being changed to the one toolbar pane.

2. A method as recited in claim 1, wherein automatically determining when the toolbar pane being displayed is to be changed comprises automatically determining that the toolbar pane being displayed is to be changed when a threshold amount of time has elapsed since the toolbar pane being displayed was last changed.

3. A method as recited in claim 1, wherein automatically determining the one toolbar pane of the multiple toolbar panes comprises automatically determining the one toolbar pane based at least in part on context information regarding a current use of the computing device that displays the Web browser window.

4. A method as recited in claim 1, wherein automatically determining the one toolbar pane of the multiple toolbar panes comprises automatically determining the one toolbar based at least in part on one or more other applications installed on the computing device that displays the Web browser window.

5. A method as recited in claim 1, wherein automatically determining the one toolbar pane of the multiple toolbar panes comprises automatically determining the one toolbar based at least in part on one or more services that the user of the Web browser window is currently logged into.

6. A method as recited in claim 1, further comprising:
receiving, while the Web browser window is displaying a Web page, a user selection to install a new toolbar pane;
obtaining a description of the new toolbar pane and one or more rules corresponding to the new toolbar pane from a server hosting the Web page;
adding the description of the new toolbar pane to a collection of toolbar panes on a device that displays the Web browser window; and
adding the one or more rules corresponding to the new toolbar pane to the set of rules.

7. A method as recited in claim 1, wherein automatically determining the one toolbar pane of the multiple toolbar panes further comprises automatically determining a second toolbar pane based at least in part on the set of rules, and wherein displaying the one toolbar pane comprises displaying both the one toolbar pane and the second toolbar pane concurrently in the toolbar.

8. A method as recited in claim 7, wherein only some of the multiple toolbar buttons in the one toolbar pane and only some of multiple buttons in the second toolbar pane are to be displayed in the toolbar, and further comprising accessing the set of rules to determine which of the multiple buttons in the one toolbar pane and which of the multiple buttons in the second toolbar pane are to be displayed in the toolbar.

9. A method as recited in claim 1, further comprising:
receiving a user request to display the multiple toolbar panes; and
displaying the multiple toolbar panes in the toolbar one after another as the user scrolls through the multiple toolbar panes.

10. One or more computer storage media having stored thereon multiple instructions that, when executed by one or more processors of a device, cause the one or more processors to:
display a toolbar in a portion of a Web browser window;
access a set of rules corresponding to the toolbar, the set of rules comprising:
time-based rules that control display of one or more of the multiple toolbar panes based on particular times or days,
occurrence-based rules that control a frequency of display of one or more of the multiple toolbar panes,
domain-based rules that control display of one or more of the multiple toolbar panes based on one or more web pages being accessed,
application-based rules that control display of one or more of the multiple toolbar panes based on one or more applications that are installed or running on the device,
service-based rules that control display of one or more of the multiple toolbar panes based on one or more services that a user of the device is logged into or using, or
location-based rules that control display of one or more of the multiple toolbar panes based on a location of the device;
automatically determine, based at least in part on the set of rules, which one toolbar pane of multiple toolbar panes is to be displayed in the toolbar, each of the multiple toolbar panes including a different collection of toolbar buttons;
display the one toolbar pane as the toolbar;
automatically determine when to change the toolbar pane being displayed in the toolbar based at least in part on whether an undo option is selected that pauses automatic changing of the toolbar pane; and
each time the toolbar pane being displayed in the toolbar is to be changed, repeat the access the set of rules, the automatically determine which one toolbar pane of multiple toolbar panes is to be displayed in the toolbar, and the display the one toolbar pane as the toolbar.

11. One or more computer storage media as recited in claim 10, the multiple instructions further causing the one or more processors to:
receive, while the Web browser window is displaying the Web page, a user selection to install a new toolbar pane;
obtain a description of the new toolbar pane and one or more rules corresponding to the new toolbar pane from a server hosting the Web page;
add the description of the new toolbar pane to a collection of toolbar panes on the device, the collection of toolbar panes including the multiple toolbar panes; and
add the one or more rules corresponding to the new toolbar pane to the set of rules.

12. One or more computer storage media as recited in claim 10, wherein to automatically determine when to change the toolbar pane being displayed is to automatically determine that the toolbar pane being displayed is to be changed when a threshold amount of time has elapsed since the toolbar pane being displayed was last changed.

13. A device comprising:
a processor; and
one or more computer storage media having stored thereon multiple instructions that, when executed by the processor, cause the processor to:
display a toolbar in a portion of a Web browser window;
access a set of rules corresponding to the toolbar, the set of rules comprising:
time-based rules that control display of one or more of the multiple toolbar panes based on particular times or days,
occurrence-based rules that control a frequency of display of one or more of the multiple toolbar panes,
domain-based rules that control display of one or more of the multiple toolbar panes based on one or more web pages being accessed,
application-based rules that control display of one or more of the multiple toolbar panes based on one or more applications that are installed or running on the device,
service-based rules that control display of one or more of the multiple toolbar panes based on one or more services that a user of the device is logged into or using, or
location-based rules that control display of one or more of the multiple toolbar panes based on a location of the device;
automatically determine, based at least in part on the set of rules, which one toolbar pane of multiple toolbar panes is to be displayed in the toolbar, each of the multiple toolbar panes including a different collection of toolbar buttons;

display the one toolbar pane as the toolbar;

automatically determine when to change the toolbar pane being displayed in the toolbar based at least in part on whether an undo option is selected that pauses automatic changing of the toolbar pane; and each time the toolbar pane being displayed in the toolbar is to be changed, repeat the access the set of rules, the automatically determine which one toolbar pane of multiple toolbar panes is to be displayed in the toolbar, and the display the one toolbar pane as the toolbar.

14. The device as recited in claim 13, the multiple instructions further causing the processor to:

receive, while the Web browser window is displaying the Web page, a user selection to install a new toolbar pane;

obtain a description of the new toolbar pane and one or more rules corresponding to the new toolbar pane from a server hosting the Web page;

add the description of the new toolbar pane to a collection of toolbar panes on the device, the collection of toolbar panes including the multiple toolbar panes; and add the one or more rules corresponding to the new toolbar pane to the set of rules.

15. The device as recited in claim 13, wherein to automatically determine when to change the toolbar pane being displayed is to automatically determine that the toolbar pane being displayed is to be changed when a threshold amount of time has elapsed since the toolbar pane being displayed was last changed.

\* \* \* \* \*